(12) United States Patent
Lewis et al.

(10) Patent No.: US 6,395,220 B1
(45) Date of Patent: May 28, 2002

(54) CARBON FIBER BINDER PITCH

(75) Inventors: Irwin C. Lewis, Strongsville; Terrence A. Pirro, Cleveland, both of OH (US)

(73) Assignee: UCAR Carbon Technology Corporation, Danbury, CT (US)

( * ) Notice: Subject to any disclaimer, the term of this patent is extended or adjusted under 35 U.S.C. 154(b) by 0 days.

(21) Appl. No.: 09/432,328

(22) Filed: Nov. 2, 1999

(51) Int. Cl.$^7$ ................................. B28B 1/52
(52) U.S. Cl. .................. 264/640; 264/638; 264/641; 264/669; 264/29.1
(58) Field of Search ........................ 428/408, 364, 428/293.4; 264/29.1, 638, 640, 641, 669, 670

(56) References Cited

U.S. PATENT DOCUMENTS

| | | | |
|---|---|---|---|
| 4,005,183 A | * | 1/1977 | Singer |
| 4,998,709 A | * | 3/1991 | Griffin et al. |
| 5,501,729 A | * | 3/1996 | Lewis et al. |
| 5,993,905 A | * | 11/1999 | Sheehan |
| 6,068,925 A | * | 5/2000 | Wilson et al. |

FOREIGN PATENT DOCUMENTS

GB      1526809      * 10/1978

* cited by examiner

*Primary Examiner*—Deborah Jones
*Assistant Examiner*—Wendy Boss
(74) *Attorney, Agent, or Firm*—DeLio & Peterson LLC

(57) ABSTRACT

Carbon fiber bundles may be dispersed into substantially single mono-filaments in pitch by stirring a mixture of fibers and pitch at a temperature at which the pitch has a viscosity of about 0.1 to about 5 poise. The resulting fiber pitch binder contains about 0.5 to about 10.0 wt. % carbon fibers substantially dispersed as substantially single mono-filaments which are randomly oriented which may then be used directly as a binder for producing carbon bodies, for example, graphite electrodes, pinstock or specialty graphite articles. This unique binder using an economical amount of carbon fibers has the capacity to increase the strength and reduce the coefficients of thermal expansion of the resulting carbon products in more than one direction due to the random orientation of the carbon fibers.

24 Claims, 7 Drawing Sheets

Fig. 2 VISCOSITY v. TEMPERATURE

▲ pre-cursor pitch (petroleum based) + 5 wt.% carbon fibers
■ pre-cursor pitch (petroleum based)

CARBON FIBER BINDER PITCH

BACKGROUND OF THE INVENTION

1. Field of the Invention

This invention relates to a composition for and method of making a binder pitch for manufacturing carbon bodies having a substantially homogenous distribution of randomly oriented carbon fibers. The resultant graphite bodies made using the novel binder pitch of the present invention have a desirably lower transverse and longitudinal coefficient of thermal expansion than conventionally made graphite bodies.

2. Description of Related Art

The use of carbon fibers as a filler with pitch as a binder is well known in the art in manufacturing carbon bodies, e.g., graphite electrodes, having a reduced coefficient of thermal expansion (CTE). Typically, carbon bodies having a low CTE are made by admixing an oriented needle-like coke with a thermoplastic carbonizing binder, such as coal tar pitch, extruding or molding the resulting mixture into a desired shape then carbonizing and graphitizing the body. Although the carbon bodies produced in this manner have a low CTE, means for further reducing the CTE are constantly sought to improve the performance of these articles in the high temperature surroundings in which they are employed.

British Patent No. 1,526,809 to Singer et al. discloses an extruded carbon article prepared using 50% to 80% of oriented fibers made from mesophase pitch and 20% to 50% of a thermoplastic carbonizable binder. The resulting carbon article had a reduced longitudinal (with-grain) coefficient of thermal expansion.

U.S. Pat. No. 4,998,709 to Griffin et al. discloses a method of making graphite electrode nipples using carbon fibers derived from mesophase pitch added to blends of coke and pitch to produce an electrode pinstock. The invention adds from 8 to 20% of mesophase pitch based carbon fibers to 65% premium coke and 22 to 28% of a binder to form an extrusion blend and extruding to form a pinstock artifact. It is believed that the high degree of alignment of the carbon fibers is necessary to achieve the decrease in longitudinal CTE. However, there appears to be an undesirable increase in the transverse (against-grain) CTE, and lower strength. The undesirable effect of a higher transverse CTE results from the carbon fibers having a very low longitudinal CTE ($-1.5 \times 10^{-6}/°$ C.) but a very high transverse CTE (about 5 to $8 \times 10^{-6}/°$ C.).

One major obstacle to attaining lower CTEs in both the transverse and longitudinal direction is the inability to homogeneously disperse the fibers in the electrode mix prior to extrusion to randomly orient the carbon fibers. Generally, when adding the fibers to the electrode mixes, it is preferable to have a fiber length no larger than that of the largest coke filler particles (about 1 inch). To achieve such a product, the carbon fibers are generally compacted with the use of a sizing material and then chopped into small bundles. Each bundle may contain up to about 20,000 mono-filaments. When these fiber bundles are added to electrode mixes containing coke and pitch or pre-blended with the coke prior to pitch addition, homogenous distribution of the bundles into individual mono-filaments is virtually impossible. The fibers cluster into balls or clumps when mixed with the electrode ingredients. FIG. 1 is a photomicrograph at 200× magnification of a cross-section of a typical electrode mix of coke filler and pitch to which fiber bundles were added and mixed in a conventional manner. The fibers 10 are shown as small light colored elliptical shapes and are agglomerated in a background of pitch 15 along with coke particles 25. These agglomerated fibers lead to poor structure in the formed electrode and require high amounts of fibers to achieve desired property improvements. During extrusion, the needle-like coke filler particles align in a substantially longitudinal orientation. This provides a measure of reduction in the CTE in the longitudinal direction, but a likely increase in the transverse direction. Thus, it would be beneficial to find a method of dispersing the carbon fibers in a random orientation to lower the CTEs in both directions.

Bearing in mind the problems and deficiencies of the prior art, it is therefore an object of the present invention to provide a method of utilizing carbon fibers to not only decrease the longitudinal CTE, but also the transverse CTE in carbon bodies, particularly graphite electrodes.

It is another object of the present invention to provide a method of dispersing carbon fibers in a pitch binder such that the fibers are randomly oriented to reduce both the transverse and longitudinal CTEs in a resultant graphite electrode.

A further object of the invention is to provide a method of utilizing the minimum amount of carbon fibers to achieve the aforementioned desired effects.

It is yet another object of the present invention to provide a carbon body having a reduced coefficient of thermal expansion.

It is still yet another object of the present invention to provide a graphite electrode having a reduced longitudinal CTE, and also a reduced transverse CTE.

Still other objects and advantages of the invention will in part be obvious and will in part be apparent from the specification.

SUMMARY OF THE INVENTION

The present invention is directed to, in a first aspect, a method of making a fiber pitch binder comprising the steps of: (a) providing a pitch having a viscosity of about 0.1 to about 5 poise; (b) providing carbon fibers in an amount of about 0.5 to about 10.0 wt. % of the pitch; and (c) admixing the fibers and the pitch to disperse the fibers into a fiber pitch binder. Preferably, step (a) comprises providing a pitch having a viscosity of about 0.1 to about 5 poise at a temperature of about 260° to about 140° C. Preferably, in step (c) the fibers are substantially dispersed into substantially single mono-filaments of a random orientation within the fiber pitch binder. Preferably, step (c) comprises admixing the fibers and the pitch by heating the fibers and the pitch to a temperature wherein the pitch has a viscosity of less than about 5 poise, followed by stirring at about 100 to about 1000 rpm for a sufficient time such that the fibers are substantially dispersed into substantially single mono-filaments which are randomly oriented within the fiber pitch binder. Upon substantial completion of step (c), the fiber pitch binder has a softening point of about 90° C. to about 200° C., a modified Conradson Carbon (MCC) value of about 50 to about $^{75}$%, and a viscosity of about 1 to about 50 poise at about 160° C.

In yet another aspect, the present invention is directed to a method of making a fiber pitch binder comprising the steps of: (a) providing a pitch having a viscosity of about 0.1 to about 5 poise; (b) providing an amount of carbon fibers; and (c) admixing the fibers and the pitch to homogeneously disperse the fibers into a fiber pitch binder such that the fibers are dispersed into substantially single mono-filaments which are randomly oriented within the fiber binder pitch.

In still another aspect, the present invention is directed to a pitch based binder comprising an admixture of pitch having a viscosity of about 0.1 to about 5 poise at a temperature of about 260 to about 140° C. with 0.5 to about 10.0 wt.% of carbon fibers based on a weight of the pitch, substantially homogeneously dispersed within the pitch as substantially single mono-filaments which are randomly oriented. The resultant admixture has a softening point of about 90 to about 200° C., a MCC value of about 50 to about 75% and a viscosity of about 1 to about 50 poise at about 160° C. Preferably, the admixture has substantially similar rheological behavior with respect to the rate of change in viscosity with temperature as the starting material pitch.

In a further aspect, the present invention is directed to a method of forming a carbon body comprising the steps of: (a) providing a binder comprising an admixture of pitch having a viscosity of about 0.1 to about 5 poise at a temperature of about 260 to about 140° C. and about 0.5 to about 10.0 wt.% of carbon fibers based on a weight of the pitch, substantially homogeneously dispersed within the pitch as substantially single mono-filaments which are randomly oriented; (b) providing a filler; (c) mixing the binder having the carbon fibers substantially homogeneously dispersed as substantially single mono-filaments and the filler to produce a binder-filler mix; (d) shaping the binder-filler mix to form a shaped body; and (e) carbonizing the shaped body to form a carbon body. Preferably, step (a) comprises providing a binder having a softening point of about 90 to about 200° C., a MCC value of about 50 to about 75%, and viscosity of about 1 to about 50 poise at about 160° C.

In still yet another aspect, the present invention is directed to a carbon body having a substantially homogenous distribution of carbon fibers dispersed within the carbon body as substantially single mono-filaments which are randomly oriented, the carbon fibers present in an amount of about 1.5 wt.% to about 3.0 wt. % based on a weight of the carbon body.

In still yet another aspect, the present invention is directed to a method of making a graphite body having a reduced coefficient of thermal expansion comprising the steps of: (a) providing a binder comprising an admixture of pitch having a viscosity of about 0.1 to about 5 poise at a temperature of about 260 to about 140° C. and about 0.5 to about 10.0 wt. % of carbon fibers based on a weight of the pitch, substantially homogeneously dispersed within the pitch as substantially single mono-filaments which are randomly oriented; (b) providing a filler; (c) mixing the binder and the filler to produce a binder-filler mix having a substantially homogenous dispersion of carbon fibers which are randomly oriented throughout; (d) shaping the binder-filler mix to form a carbon body; (e) carbonizing the carbon body; and (f) graphitizing the carbon body to form a graphite body. Preferably, step (f) comprises graphitizing the carbon body to form a graphite body having about 1.5 wt. % carbon fibers based on a weight of the graphite body, substantially dispersed throughout the graphite body as substantially single mono-filaments which are randomly oriented.

In still yet a further aspect, the present invention is directed to a graphite body having a substantially homogenous distribution of carbon fibers dispersed within the carbon body as substantially single mono-filaments which are randomly oriented, the carbon fibers present in an amount of about 1.5 wt. % to about 3.0 wt. % based on a weight of the graphite body.

In still yet a further aspect, the present invention is directed to a graphite body having a longitudinal coefficient of thermal expansion of about $-0.5 \times 10^{-6}/°$ C. to about $0.2 \times 10^{-6}/°$ C. as measured from about 25 to about 200° C.

In still another aspect, the present invention is directed to a graphite body having a substantially homogenous distribution of carbon fibers dispersed within said graphite body as substantially single mono-filaments of a random orientation, said carbon fibers present in an amount of about 1.5 wt.% based on a weight of said graphite body.

In still another aspect, the present invention is directed to a graphite body produced by a method of: (a) providing a binder comprising an admixture of pitch having about 0.5 to about 10.0 wt. % of carbon fibers based on a weight of said pitch, substantially homogeneously dispersed within said pitch as substantially single mono-filaments of a random orientation; (b) providing a filler; (c) mixing said binder and said filler to produce a binder-filler mix having a substantially homogenous dispersion of carbon fibers which are randomly oriented throughout; (d) extruding said binder-filler mix to form a carbon body; (e) carbonizing said carbon body; (f) graphitizing said carbon body to produce said graphite body having about 1.5 to about 3.0 wt. % carbon fibers based on a weight of said graphite body, said fibers dispersed throughout said graphite body as substantially single mono-filaments of a random orientation.

In a final aspect, the present invention is directed to a graphite body produced by a method of: (a) mixing a binder comprising an admixture of pitch having a viscosity of about 0.1 to about 5 poise at a temperature of about 260 to about 140° C. and about 0.5 to about 10.0 wt. % of carbon fibers based on a weight of said pitch, said fibers substantially homogeneously dispersed within said pitch as substantially single mono-filaments of a random orientation, with a coke filler to form a binder-filler mix; (b) extruding said binder-filler mix to form a carbon body; (c) carbonizing said carbon body; and (d) graphitizing said carbon body to produce said graphite body having about 1.5 to about 3.0 wt. % carbon fibers based on a weight of said graphite body, said fibers dispersed throughout said graphite body as substantially single mono-filaments of a random orientation.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s) which follows taken in conjunction with the accompanying drawings in which:

FIG. 5A is a transverse (against grain) view of the electrode taken using polarized light so that the fibers are easier to view. FIG. 5B is a longitudinal (with grain) view of the electrode using bright field illumination.

DESCRIPTION OF THE PREFERRED EMBODIMENT(s)

Figure 1:
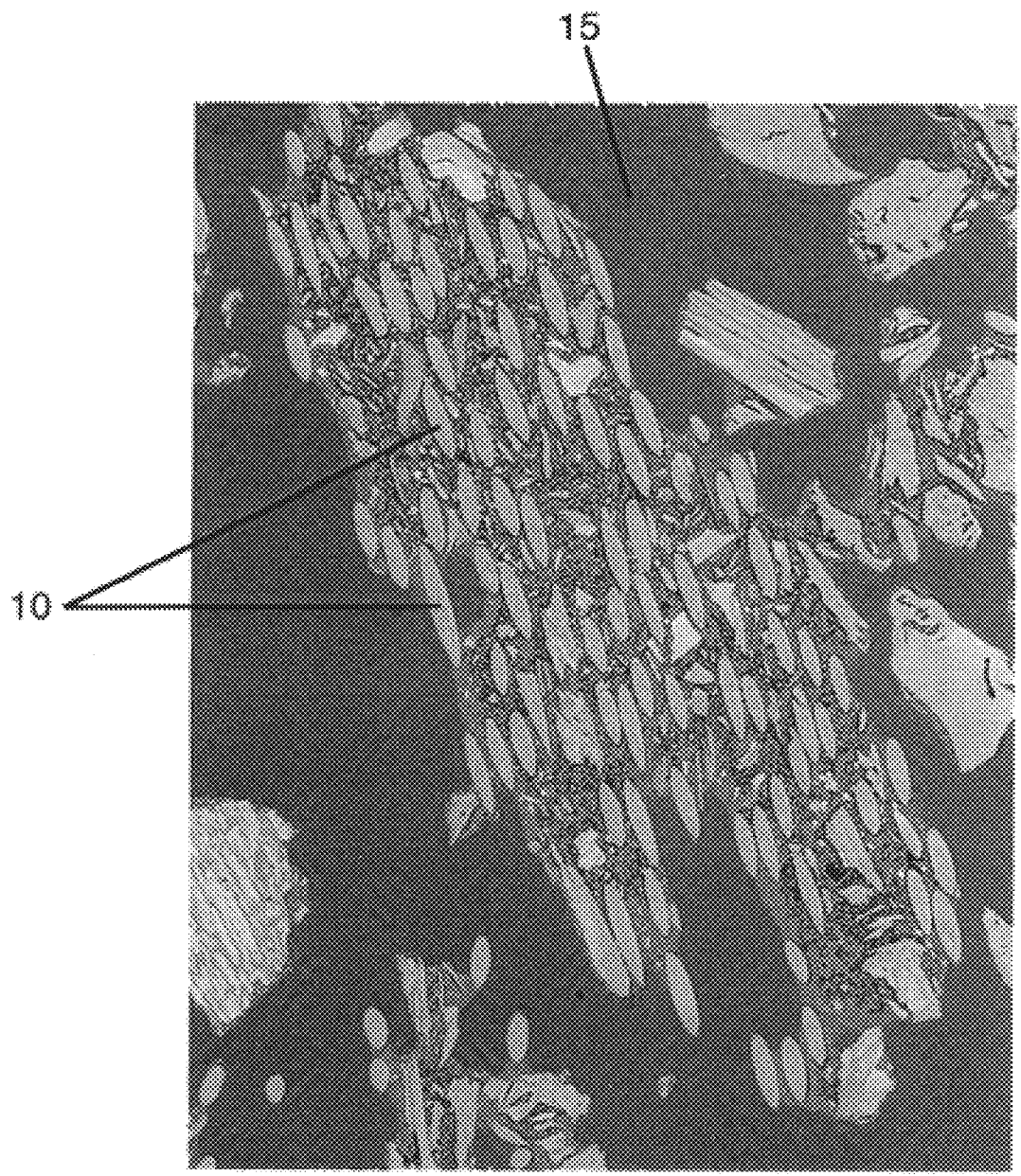
FIG. 1 is a photomicrograph taken at 200× magnification by a model MEF4M Reichert microscope manufactured by The Leica Company of Austria of a conventional electrode mix of coke filler 25 and pitch 15 to which carbon fiber bundles were added and mixed in a conventional manner.
Figure 2:
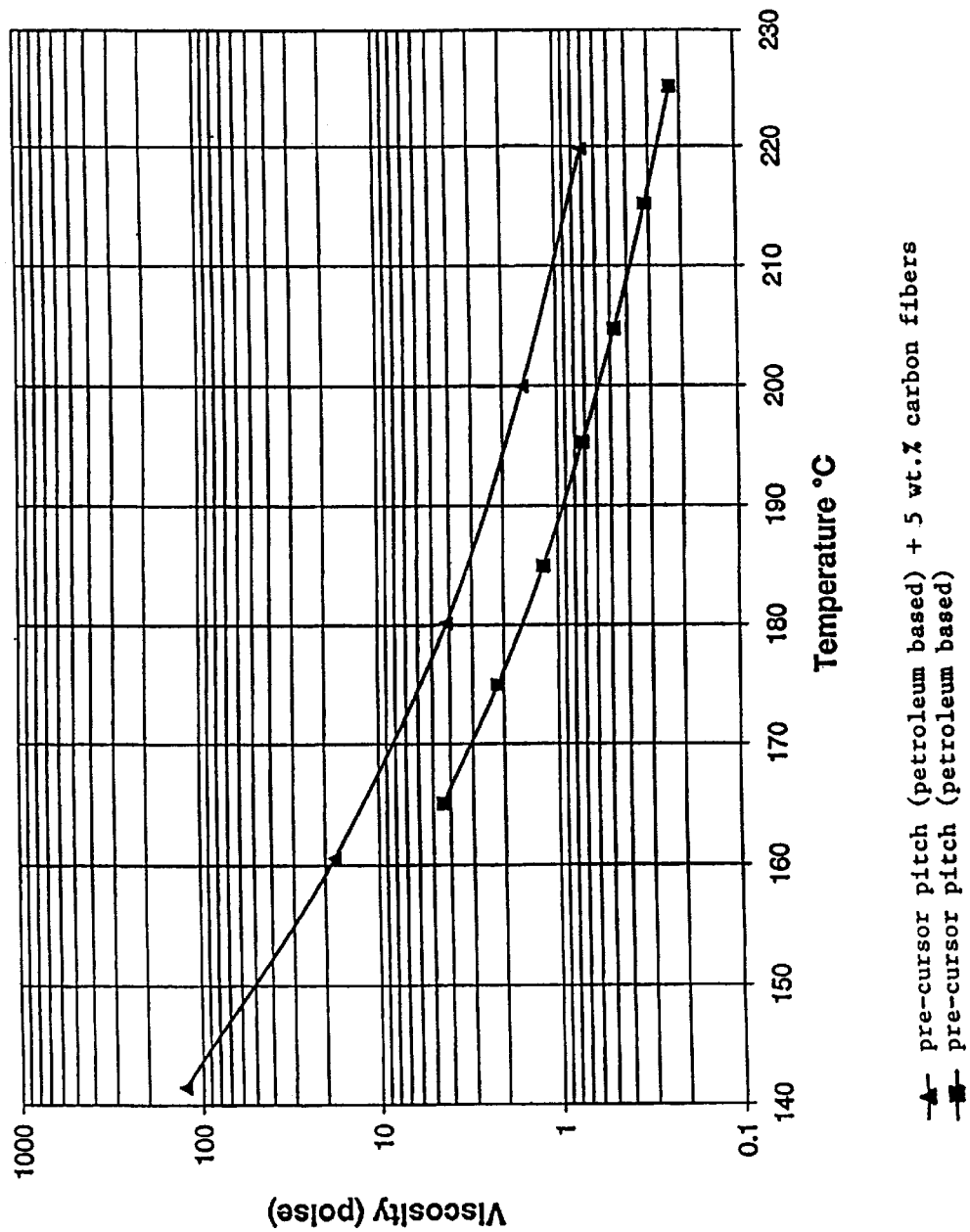
FIG. 2 is a chart plotting viscosity versus temperature comparing the rheological behavior of the precursor petroleum pitch and the fiber pitch binder of the present invention. The precursor petroleum pitch is represented by the square data points. The fiber pitch binder is represented by the triangular data points.

In describing the preferred embodiment of the present invention, reference will be made herein to FIGS. 1–6 of the drawings in which like numerals refer to like features of the invention. Features of the invention are not necessarily shown to scale in the drawings.

It has now been shown that fiber bundles with or without sizing may be dispersed into randomly oriented, substantially single mono-filaments in a carbon body by blending the carbon fibers in a pitch binder at a temperature at which the pitch preferably has a viscosity less than about 5 poise, more preferably about 0.1 poise at a temperature of about 260° C. to about 140° C. In accordance with the present invention, up to at least about 0.5 wt. % to about 10 wt. % carbon fibers (based on a weight of the pitch) randomly oriented in pitch may be made as a fiber pitch binder for subsequent homogenous distribution of fibers in carbon bodies having a longitudinal CTE of about $-0.5 \times 10^6$ to less than $0.14 \times 10^6/°$ C. as measured from about 25 to about 200° C. The longitudinal CTEs are reduced by an absolute value of about 0.1 to about $0.5 \times 10^6/°$ C. units. The use of such an economical amount of carbon fibers unexpectedly provides homogenous distribution of the randomly oriented fibers as substantially single mono-filaments throughout the fiber pitch binder.

The resulting fiber pitch binder may be used as a binder with the appropriate filler to extrude or mold carbon bodies having the desired dispersion of substantially single mono-filaments throughout wherein the random orientation of the fibers provides a reduction in the longitudinal and transverse coefficients of thermal expansion. In addition, the fiber pitch binder exhibits a comparable viscosity to that of the precursor pitch in terms of the effects of temperature on viscosity, such that existing equipment may be used in preparing the fiber pitch binder.

The carbon fibers used in the present invention may be derived from such carbonaceous starting materials as mesophase pitch, isotropic pitch, polyacrylonitrile (PAN), and rayon. Carbon fibers useful in the present invention may vary in diameter and length. Preferably, the diameter of the fibers is between about 5 $\mu$m to about 30 $\mu$m. The fibers may be cut into convenient lengths of about 5 mm to about 40 mm. Preferably, the carbon fibers after graphitization have a tensile strength greater than about 100,000 psi, most preferably greater than about 300,000 psi.

The precursor pitch may be either petroleum or coal tar derived and may contain up to about 18% natural Q.I. particles prior to blending with the fibers. The Q.I. particles refer to the percentage of particles in a given pitch which are insoluble in quinoline as determined by quinoline extraction at 75° C. Pitches derived from petroleum and coal tar are preferred in practicing the present invention. Although other pitches may be contemplated, it is preferred that the pitch have a viscosity of about 0.1 to about 5 poise at a temperature of about 260° C. to about 140° C. At this by preferred viscosity, the fiber bundles can be dispersed into mono-filaments which are randomly oriented within the pitch.

In accordance with the present invention, carbon fibers, which are typically available in bundles, having a fiber diameter of about 7 $\mu$m to about 12 $\mu$m, are obtained with or without sizing. The fiber bundles are chopped into smaller bundles about 6 mm to about 30 mm long and admixed with a pitch using a conventional paddle blade stirrer. Most preferably, the precursor pitch has a viscosity of about 0.1 to about 3 poise at a temperature of about 260° C. to about 140° C. The admixing occurs by heating the fibers and the precursor pitch to a temperature wherein the precursor pitch has a viscosity of less than about 5 poise, followed by stirring at about 100 to about 1000 rpm for a sufficient time, e.g., about 10 to about 120 minutes, such that the fibers are substantially dispersed into substantially single mono-filaments which are randomly oriented within the fiber pitch binder. The resulting fiber pitch binder has a substantially homogenous dispersion of randomly oriented carbon fibers therein. Unexpectedly, it is the random orientation of the carbon fibers dispersed as substantially single mono-filaments while using a smaller amount of fibers which provides advantages such as lower longitudinal and transverse CTEs, higher strength and improved fracture toughness.

In a preferred embodiment, carbon fibers derived from mesophase pitch were obtained from Amoco Corporation under the tradename GPX™. The fibers were obtained unsized and chopped into about ¼ bundles. The fibers were added to a petroleum derived precursor pitch which contained about 0% Q.I. solids, had an initial softening point (SP) of about 113° C., and a MCC value of about 49.3%. A mixture of about 15 g of fibers and about 300 g of pitch (fibers present in about 5 wt. % of a weight of the pitch) was heated in a resin flask to about 255° C. An inert gas atmosphere was maintained to avoid oxidation, if any. The mixture was then stirred at about 1000 rpm for about two hours using a conventional paddle blade stirrer. The stirring was maintained until the fiber pitch binder had cooled to about 150° C.

The resulting fiber pitch binder had a SP of about 118° C., and a MCC value of about 51.6%. The viscosity versus temperature data for the fiber pitch binder are plotted in comparison with the precursor pitch in FIG. 2 and the rheological behavior for both materials is similar. The fiber pitch binder data are shown by the is triangular data points and the precursor pitch is shown by the square data points. Although the absolute viscosity of the fiber pitch binder has increased, the temperature dependence of viscosity for the two systems is similar. The fiber pitch binder may be used as the binder to extrude carbon bodies using the same equipment as the precursor pitch with only a small defined adjustment in temperature. The fiber pitch binder was then examined using optical microscopy. A photomicrograph taken at 200× magnification confirms its dispersement as substantially single mono-filaments.

Figure 3:
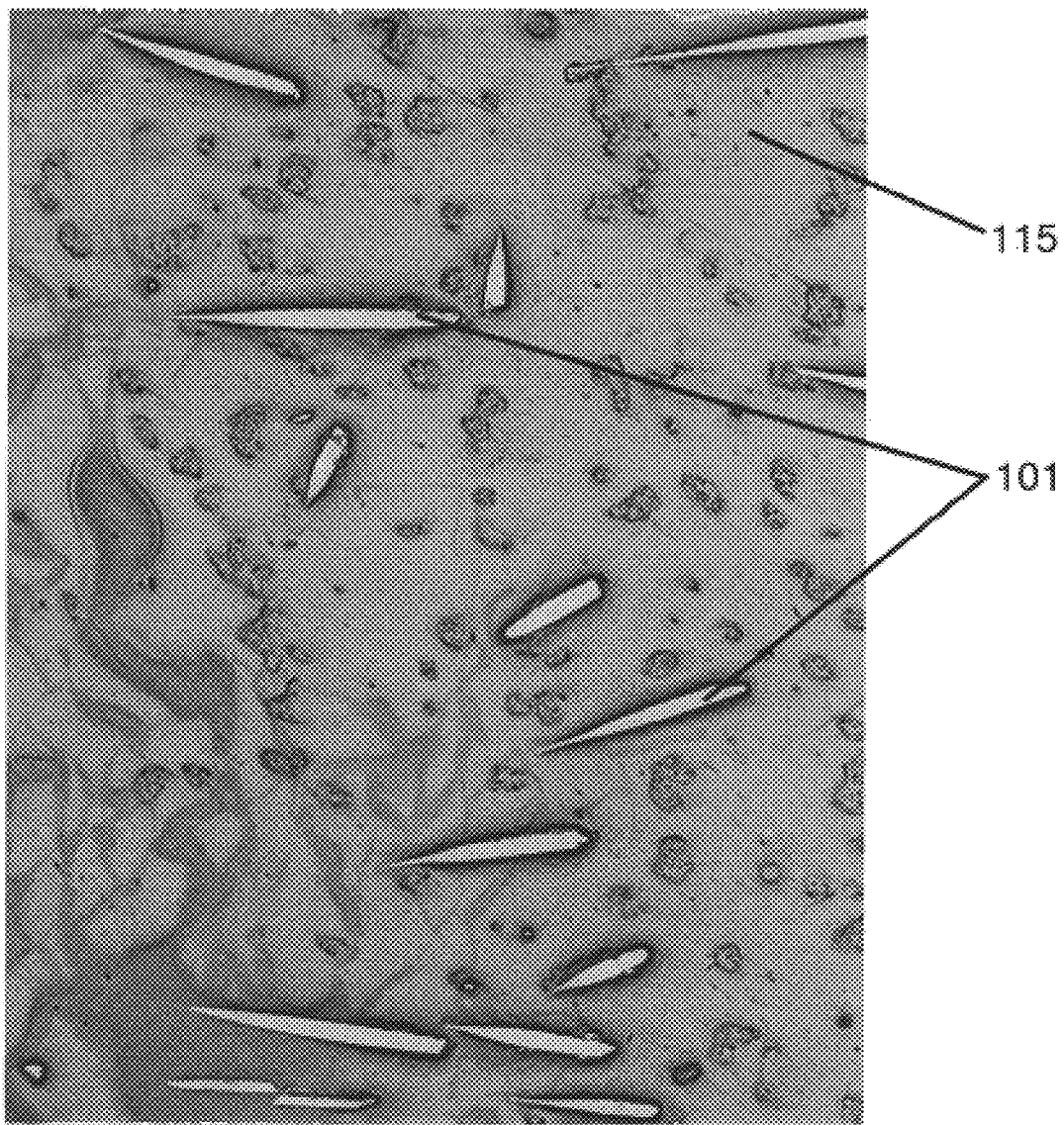
FIG. 3 is a photomicrograph taken at 200× magnification by a model MEF4M Reichert microscope manufactured by The Leica Company of Austria of the fiber pitch binder of the present invention showing substantial dispersion of substantially single mono-filaments of the carbon fibers within the pitch binder.
Figure 4:
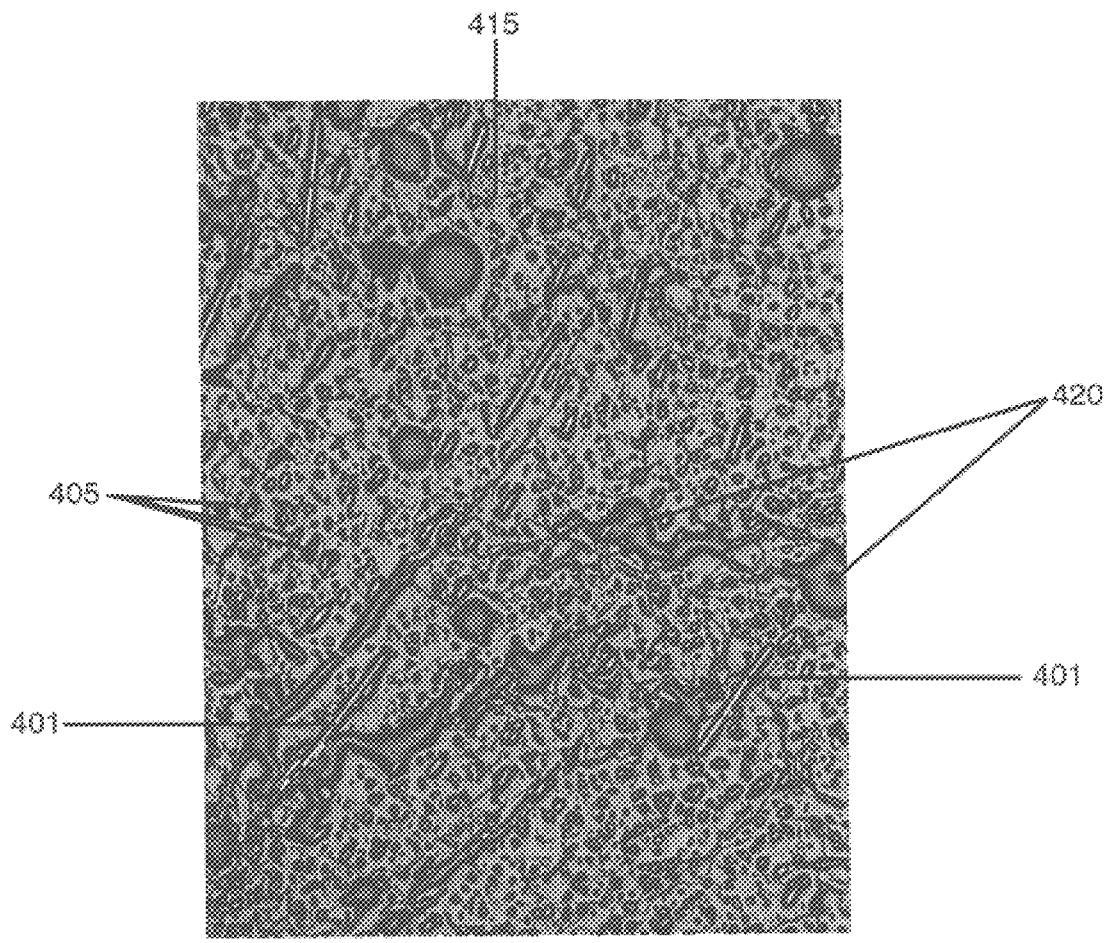
FIG. 4 is a photomicrograph taken at 50× magnification by a model MEF4M Reichert microscope manufactured by The Leica Company of Austria of the fiber pitch binder of the present invention, showing substantial dispersion of the substantially single mono-filaments of the carbon fibers in a random orientation within the pitch.

As shown in the FIG. 3 photomicrograph, the fiber bundles have been substantially dispersed as substantially single mono-filaments 101 throughout the pitch 115. In the photomicrograph of FIG. 4, taken at only 50× magnification, the fiber mono-filaments 401, 405 are randomly oriented and homogeneously dispersed in a background of pitch 415. The longitudinal section of the carbon fibers is seen as a needle-like structure 401, while the transverse sections are seen as circular structures 405. The observation of a distribution of both longitudinal and transverse sections of fibers confirms that the fibers are randomly oriented within the pitch. The porosity of the sample, shown by voids 420, is filled with an epoxy resin when preparing the sample. In comparison with FIG. 1, where the same fiber bundles were blended in a conventional manner with coke particles 25 and added to a pitch binder 15 for extrusion, the fibers 10 are shown agglomerated together and unsatisfactorily dispersed. Furthermore, in FIG. 1, these agglomerated fibers maintain their fixed orientation which persists during formation of the carbon body.

In another preferred embodiment, the same Amoco GPX™ fibers were admixed at about 5 wt. % of a weight of the pitch comprising a coal tar precursor pitch having a SP of about 121°, a MCC value of about 60% and about 12% Q.I. The admixing was performed at about 255° C. for about two hours. The resulting fiber pitch binder had a SP of about 117° C. and a MCC value of about 62%. Examination by microscopy again showed that the fiber bundles were homogeneously dispersed as substantially single mono-filaments throughout the pitch.

In yet another preferred embodiment, mesophase pitch bulk fibers were obtained from Mitsubishi Chemical Co. in the form of ¼" long compacted bundles which contained about 3% of a polyamide sizing. These fibers were blended with a coal tar pitch in an amount of about 5 wt. % of the pitch. After blending, the resulting fiber pitch binder had a SP of about 115° C., and a MCC value of about 63%. Examination of the material by microscopy again showed homogenous dispersion of the bundles into individual mono-filaments with a random orientation. It is evident that the polymer sizing did not interfere with the process.

It is desirable to blend the fibers with the precursor pitch at the lowest possible temperature to avoid oxidation or volatilization of the pitch. Fiber pitch binders containing about 5 wt. % of Amoco GPX™ fibers with the petroleum pitch described above were prepared at several different temperatures. The temperatures used and the viscosity measured for the precursor pitch at that temperature are shown in Table I. All the binders were examined by optical microscopy and in each case the dispersion of the fibers was judged to be substantially homogenous. Only at the lowest temperature, below about 175° C., was there evidence of some small fiber clusters. It is therefore evident that the blending process may be carried out at a temperature at which the original pitch has a viscosity at least as high as 2 poise. Furthermore, since oxidation of pitch is very slow at these temperatures, the blending may be carried out in ambient air. The photomicrograph in FIG. 4 represents the binder produced in Run No. 1.

TABLE I

Blending of about 5 wt. % Fibers with Petroleum Derived Pitch at Different Temperatures

| Run No. | Temp. (° C.) | Viscosity (poise) |
| --- | --- | --- |
| 1 | 225 | 0.225 |
| 2 | 200 | 0.60 |
| 3 | 175 | 2.15 |

In still yet another preferred embodiment, the previously described fiber pitch binders having about 5 wt. % carbon fibers were used as binders to produce 44 mm diameter graphitized pinstock. These binders were mixed in an amount of a about 24 wt. % at about 160° C. with a typical coke particle/flour mix and then extruded at about 110° C. to produce green electrode pinstock. The mix temperature, extrusion temperature and extrusion pressure were all comparable to those used for a standard pinstock mix produced with a binder pitch without fiber. The extruded electrode pinstocks were carbonized and graphitized under standard conditions to produce graphite electrode pinstock having about 1.5 wt. % carbon fibers. Examination of the electrode pinstocks by microscopy confirmed that the fibers were well dispersed in a random orientation and the structure of the electrode pinstocks was adjudged to be excellent. The electrode pinstock made from the fiber pitch binder showed about 25% to about 60% reduction in the CTE as well as improved strength when compared with typical electrode pinstock conventionally prepared without fibers. With incorporation of the randomly oriented carbon fibers, the electrode pinstock made using the fiber petroleum pitch binder and the same coke filler had a longitudinal CTE of about $0.057 \times 10^{-6}/°$ C. The electrode pinstock using the fiber coal tar pitch binder and the same coke filler had a longitudinal CTE of about $0.104 \times 10^{-6}/°$ C.

Figure 5A:
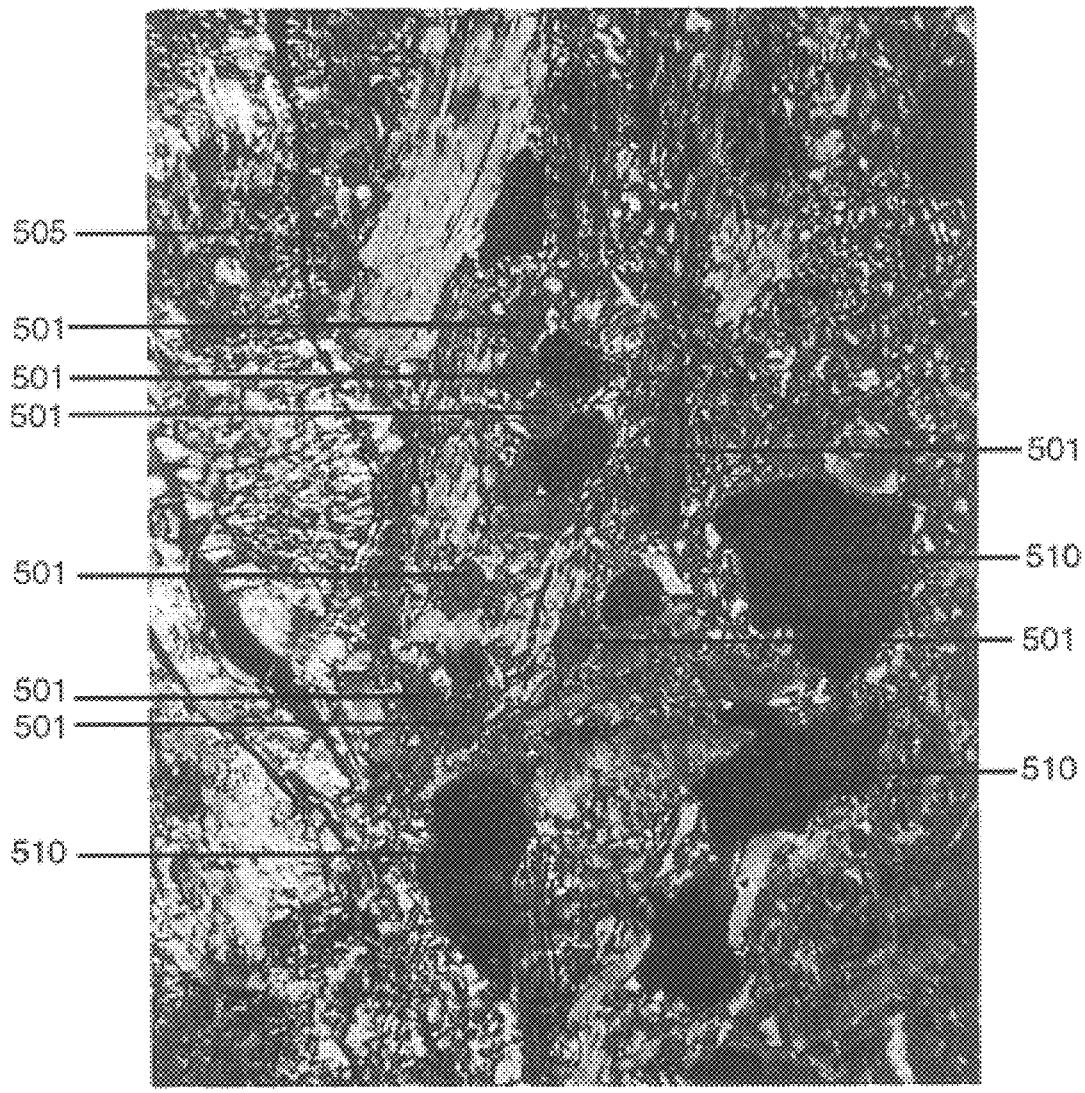
FIGS. 5A and 5B are photomicrographs taken at 400× magnification by a model MEF4M Reichert microscope manufactured by The Leica Company of Austria of a graphite electrode made from an electrode mix of coke filler and coal tar derived pitch to which about 1.5 wt. % carbon fiber bundles were added and mixed in a conventional manner.
Figure 5B:
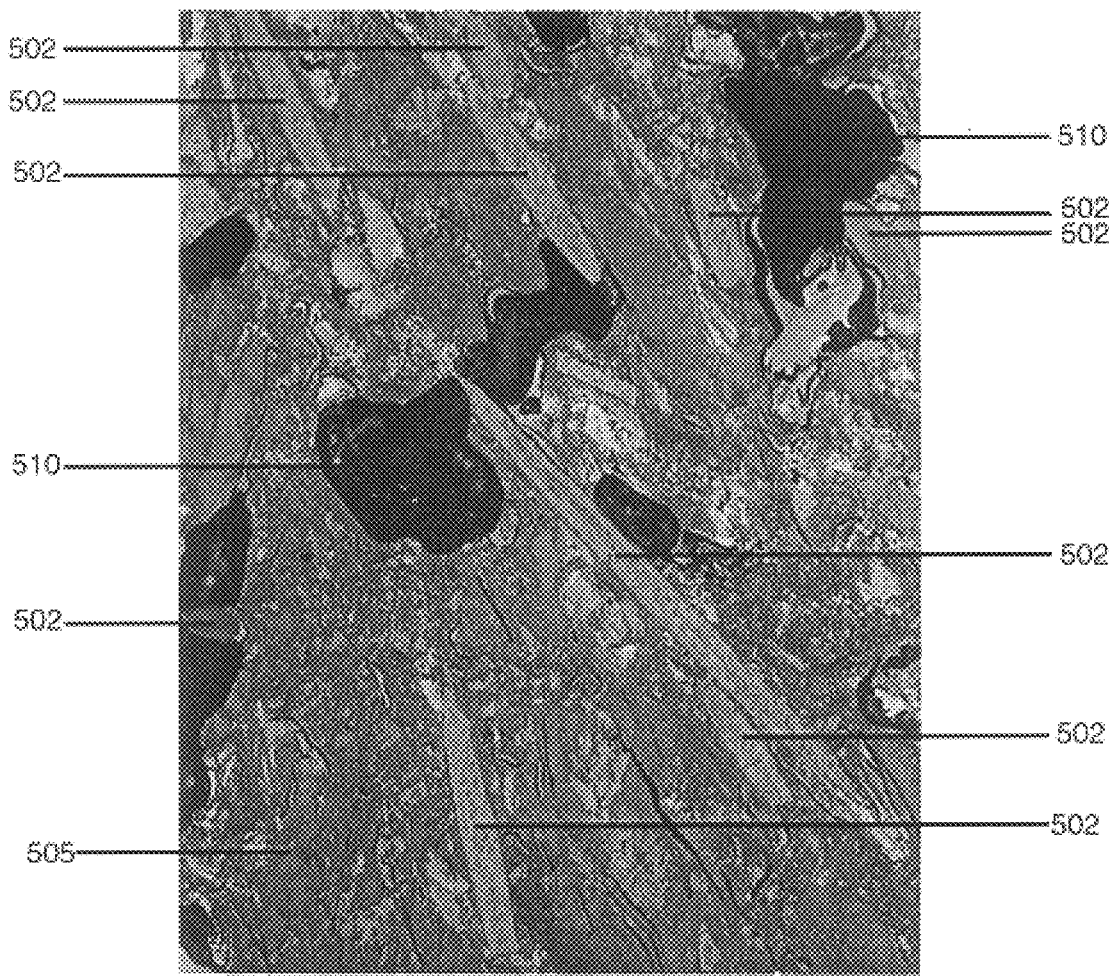

FIGS. 5A and 5B are photomicrographs taken at 400× magnification of a prior art graphite electrode produced by adding carbon fibers in a conventional manner to the coke filler pitch binder mix. FIG. 5A is a transverse view and FIG. 5B is a longitudinal view of the electrode. The fibers 501 in FIG. 5A are clumped together in a transverse orientation against a background of graphite 505. The fibers 502 in FIG. 5B clearly show a longitudinal orientation of the fibers against a background of graphite 505. The numerous transverse sections of the fibers seen in the transverse view together with the longitudinal sections of the fibers observed in the longitudinal view of the electrode confirm that the fibers are aligned in the direction of extrusion.

Figure 6:
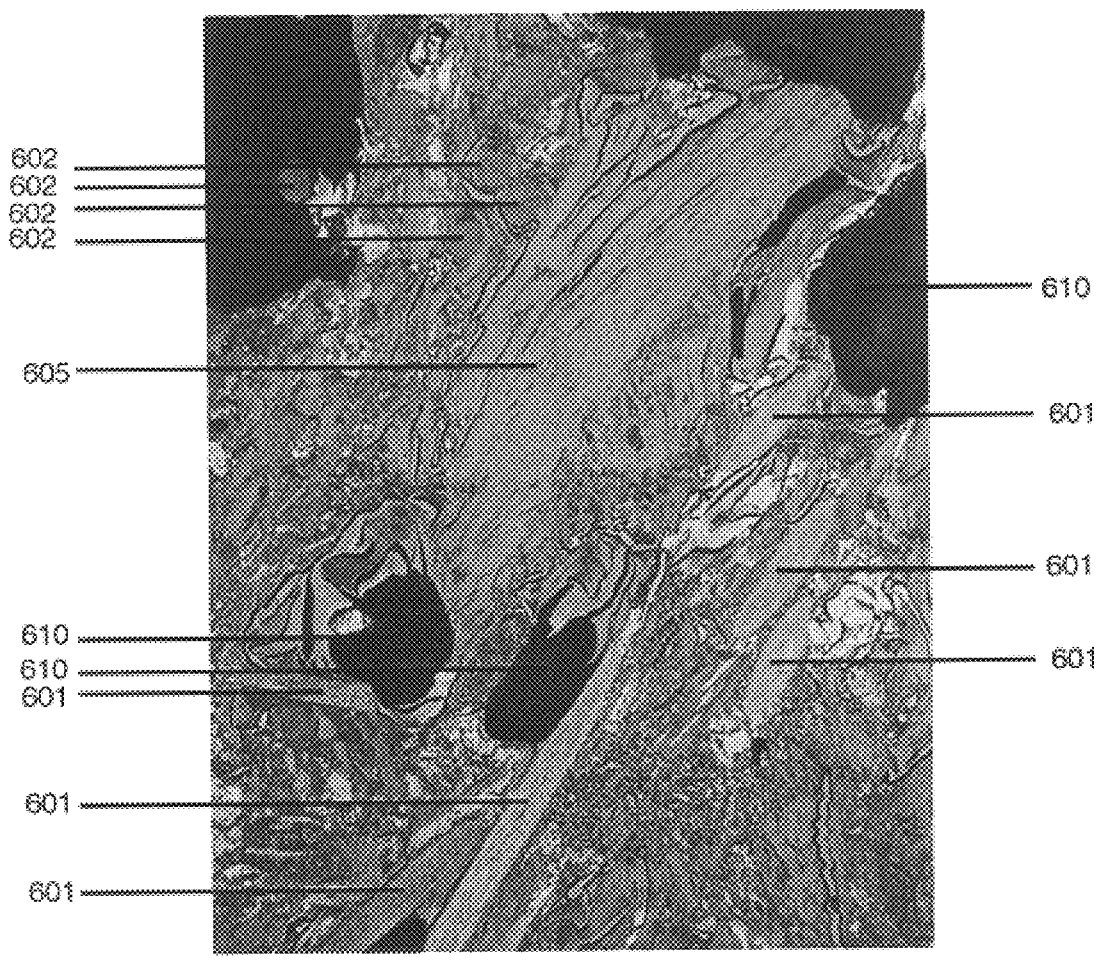
FIG. 6 is a photomicrograph taken at 400× magnification by a model MEF4M Reichert microscope manufactured by The Leica Company of Austria using bright field illumination of a graphite electrode made from an electrode mix of coke filler and the carbon fiber coal tar derived pitch binder of the present invention.

Surprisingly, graphite electrodes prepared using the fiber pitch binder of the present invention show a substantially random orientation of the carbon fibers as seen in FIG. 6. The photomicrograph of FIG. 6 is a 400× magnification of a longitudinal view of a graphite electrode made using the fiber pitch binder of the present invention having about 1.5 wt. % carbon fibers. The random orientation of the fibers is confirmed by the appearance of both needle-like structures 601 as longitudinal sections of the individual fibers and circular structures 602 representing transverse cross-sections of the individual fibers. The fibers are substantially single mono-filaments in a background of graphite 605. Any porosity in the sample was filled with epoxy resin during preparation of the microscopy sample as shown by voids 610. Given the substantially random orientation of the fibers in the electrode, the CTE is lowered in both longitudinal and transverse directions compared to conventional fiber containing electrodes.

The present invention achieves the objects recited above. By admixing the carbon fibers in a precursor pitch at a temperature at which the pitch has a viscosity of less than about 5 poise, the present invention provides a homogenous distribution of the fibers as substantially single monofilaments in a random orientation while using a minimum amount of fibers of about 0.5 to about 10.0 wt. % of the pitch. The carbon fiber pitch may preferably be used as a binder for graphite electrodes which exhibit a reduced coefficient of thermal expansion and increased strength. Since the binder is admixed with coke at about 20 to about 30 wt. % to form an electrode, the total amount of fibers used in the electrode is less than about 3 wt. % based on a weight of the electrode, an economical and cost effective amount.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of making a fiber pitch binder comprising the steps of:
    (a) providing a pitch having a viscosity of about 0.1 to about 5 poise;
    (b) providing carbon fibers in an amount of about 0.5 to about 10.0 wt. % of said pitch; and
    (c) admixing said fibers and said pitch to disperse said fibers into a fiber pitch binder.

2. The method of claim 1 wherein step (a) comprises providing a pitch having a viscosity of about 0.1 to about 5 poise at a temperature of about 260° to about 140° C.

3. The method of claim 1 wherein in step (c) said fibers are substantially dispersed into substantially single monofilaments which are randomly oriented within the fiber pitch binder.

4. The method of claim 1 wherein step (b) comprises providing carbon fibers in an amount of about 5 wt. % of said pitch.

5. The method of claim 1 wherein step (b) comprises providing an amount of carbon fibers having a length of about 6 to about 30 mm.

6. The method of claim 5 wherein step (b) comprises providing an amount of carbon fibers containing sizing.

7. The method of claim 1 wherein in step (b) said fibers are added to said pitch without a substantial amount of a filler.

8. The method of claim 1 wherein step (a) comprises providing an amount of pitch derived from coal tar.

9. The method of claim 1 wherein step (a) comprises providing an amount of pitch derived from petroleum feedstock.

10. The method of claim 1 wherein step (c) comprises admixing said fibers and said pitch by heating said fibers and said pitch to a temperature wherein said pitch has a viscosity of less than about 5 poise, followed by stirring at about 100 to about 1000 rpm for a sufficient time such that said fibers are substantially dispersed into substantially single monofilaments which are randomly oriented within the fiber pitch binder.

11. The method of claim 1 wherein upon substantial completion of step (c), the fiber pitch binder has a softening point of about 90° C. to about 200° C., a MCC value of about 50 to about 75%, and a viscosity of about 1 to about 50 poise at about 160° C.

12. A method of making a fiber pitch binder comprising the steps of:
    (a) providing a pitch having a viscosity of about 0.1 to about 5 poise;
    (b) providing an amount of carbon fibers; and
    (c) admixing said fibers and said pitch to homogeneously disperse said fibers into a fiber pitch binder such that said fibers are dispersed into substantially single monofilaments which are randomly oriented within the fiber binder pitch.

13. The method of claim 11 wherein step (b) comprises providing carbon fibers in an amount of about 5 wt.%b of said pitch.

14. The method of claim 11 wherein in step (b) said fibers are added to said pitch without a substantial amount of a filler.

15. A pitch based binder comprising an admixture of pitch having a viscosity of about 0.1 to about 5 poise at a temperature of about 260 to about 140° C. with 0.5 to about 10.0 wt. % of carbon fibers based on a weight of said pitch, substantially homogeneously dispersed within said pitch as substantially single mono-filaments which are randomly oriented.

16. The pitch based binder of claim 15 wherein said admixture has a softening point of about 90 to about 200° C., a MCC value of about 50 to about 75% and a viscosity of about 1 to about 50 poise at about 160° C.

17. The pitch based binder of claim 15 wherein said admixture has substantially similar rheological behavior as said pitch.

18. A method of forming a carbon body comprising the steps of:
    (a) providing a binder comprising an admixture of pitch having a viscosity of about 0.1 to about 5 poise at a temperature of about 260 to about 140° C. and about 0.5 to about 10.0 wt. % of carbon fibers based on a weight of said pitch, substantially homogeneously dispersed within said pitch as substantially single monofilaments which are randomly oriented;
    (b) providing a filler;
    (c) mixing said binder having said carbon fibers substantially homogeneously dispersed as substantially single mono-filaments which are randomly oriented with said filler to produce a binder-filler mix;
    (d) shaping said binder-filler mix to form a shaped body; and
    (e) carbonizing said shaped body to form a carbon body.

19. The method of claim 18 wherein step (a) comprises providing a binder having a softening point of about 90 to about 200° C., a MCC value of about 50 to about 75%, and viscosity of about 1 to about 50 poise at about 160° C.

20. The method of claim 18 wherein in step (a) said pitch is derived from coal tar.

21. The method of claim 18 wherein in step (a) said pitch is derived from petroleum feedstock.

22. A method of making a graphite body having a reduced coefficient of thermal expansion comprising the steps of:
    (a) providing a binder comprising an admixture of pitch having a viscosity of about 0.1 to about 5 poise at a temperature of about 260 to about 140° C. and about 0.5 to about 10.0 wt. % of carbon fibers based on a weight of said pitch, substantially homogeneously dispersed within said pitch as substantially single monofilaments which are randomly oriented;

(b) providing a filler;

(c) mixing said binder and said filler to produce a binder-filler mix having a substantially homogenous dispersion of carbon fibers which are randomly oriented throughout;

(d) extruding said binder-filler mix to form a carbon body;

(e) carbonizing said carbon body; and (f) graphitizing said carbon body to form a graphite body.

23. The method of claim 22 wherein step (f) comprises graphitizing said carbon body to form a graphite body having carbon fibers substantially homogeneously dispersed throughout said graphite body as substantially single mono-filaments of a random orientation.

24. The method of claim 22 wherein step (f) comprises graphitizing said carbon body to form a graphite body having about 1.5 to about 3.0 wt. % carbon fibers based on a weight of said graphite body, substantially homogeneously dispersed throughout said graphite body as substantially single mono-filaments of a random orientation.

* * * * *

UNITED STATES PATENT AND TRADEMARK OFFICE
CERTIFICATE OF CORRECTION

PATENT NO. : 6,395,220 B1  Page 1 of 1
DATED : May 28, 2002
INVENTOR(S) : Lewis et al.

It is certified that error appears in the above-identified patent and that said Letters Patent is hereby corrected as shown below:

Column 1,
Line 46, "(-1.5x10$^{-6}$ºC.) but a..." should read as -- (-1.5x10$^{-6}$/ºC.) but a... --.

Column 2,
Line 56, "...to about $^{75}$%, and a ...." should read as -- ...to about 75%, and a .... --.

Column 5,
Line 40, "...of about -0.5x10$^6$ to less" should read as -- ...of about -0.5x10$^{-6}$ to less --.
Line 41, "than 0.14x10$^6$/ºC as measured..." should read as
-- than 0.14x10$^{-6}$/ºC as measured... --.
Line 43, "...to about 0.5x10$^6$/ºC units" should read as -- to about 0.5x10$^{-6}$/ºC units... --.

Column 6,
Line 40, "...into about ¼ bundles. The fibers were" should read as -- "...into about ¼" bundles. The fibers were --.
Line 57, "...by the is triangular data..." should read as -- ...by the triangular data... --.

Column 10,
Line 13, "...of about 5 wt.%b of" should read as -- ...of about 5 wt.% of --.

Signed and Sealed this

Twenty-third Day of July, 2002

Attest:

Attesting Officer

JAMES E. ROGAN
Director of the United States Patent and Trademark Office